(No Model.) 2 Sheets—Sheet 1.
L. SCHAUB.
APPARATUS FOR ATTACHING STEMS AND FEET TO GLASS ARTICLES.
No. 509,250. Patented Nov. 21, 1893.
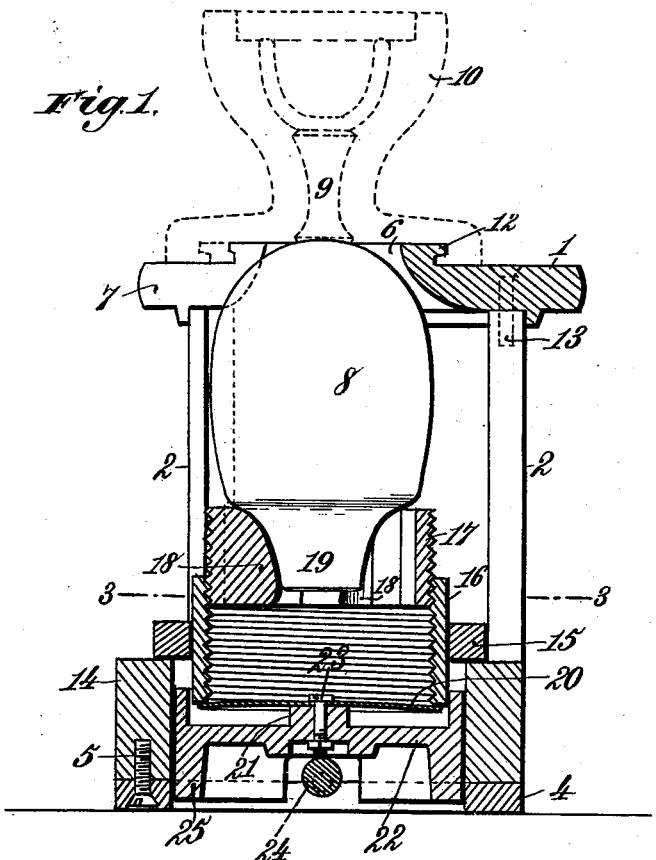
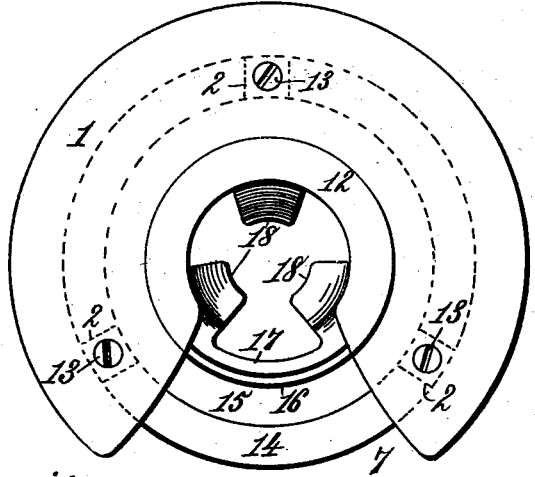
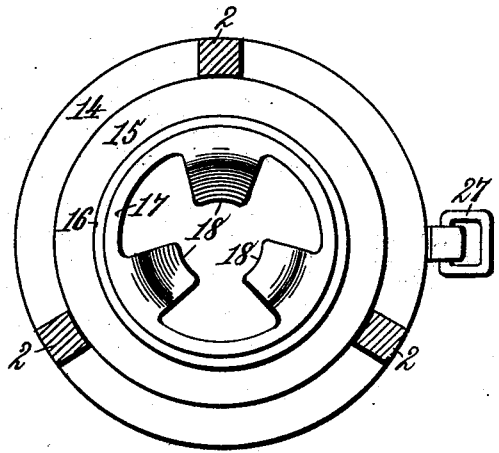
Witnesses.
Inventor.
Louis Schaub.
By James L. Norris.
Atty.

(No Model.) 2 Sheets—Sheet 2.
L. SCHAUB.
APPARATUS FOR ATTACHING STEMS AND FEET TO GLASS ARTICLES.
No. 509,250. Patented Nov. 21, 1893.
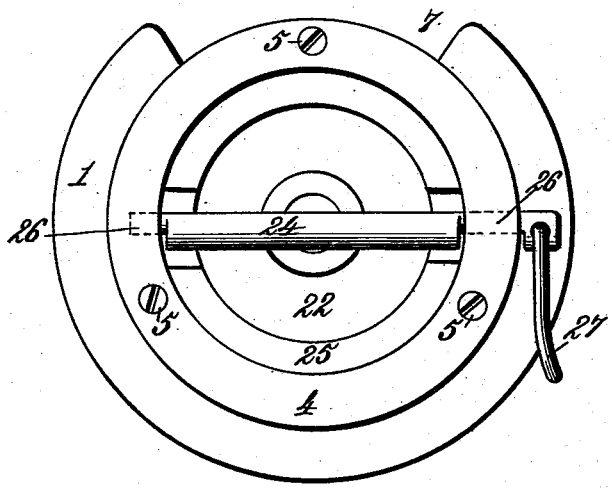
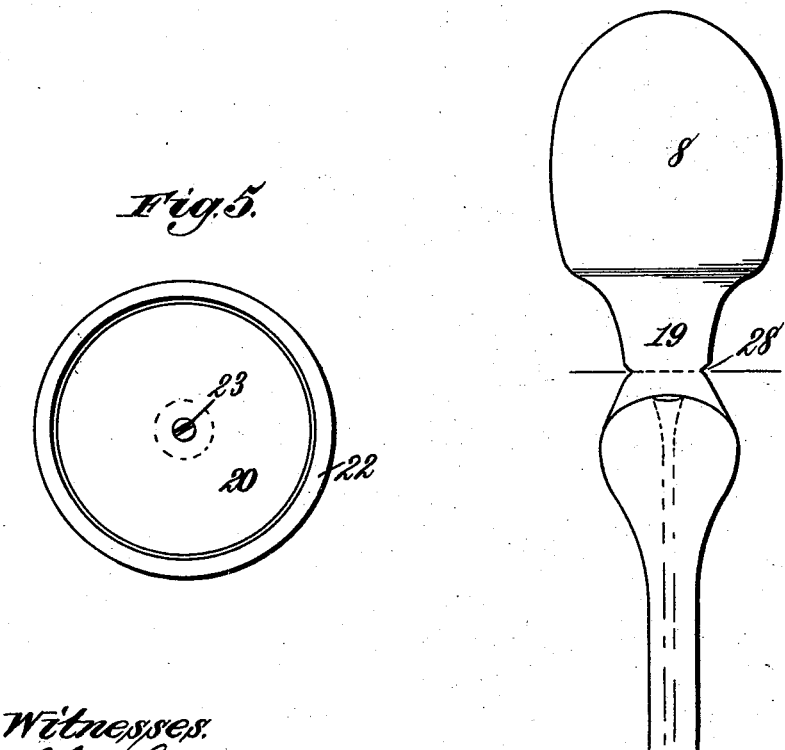
Witnesses.
Inventor:
Louis Schaub.
By James L. Norris.
Atty.

UNITED STATES PATENT OFFICE.

LOUIS SCHAUB, OF WHEELING, WEST VIRGINIA.

APPARATUS FOR ATTACHING STEMS AND FEET TO GLASS ARTICLES.

SPECIFICATION forming part of Letters Patent No. 509,250, dated November 21, 1893.

Application filed June 26, 1893. Serial No. 478,850. (No model.)

*To all whom it may concern:*

Be it known that I, LOUIS SCHAUB, a citizen of the United States, residing at Wheeling, in the county of Ohio and State of West Virginia, have invented new and useful Improvements in Apparatus for Attaching Stems and Feet to Glass Articles, of which the following is a specification.

This invention has for its object to provide a novel, simple, efficient, and economical apparatus for attaching any desired construction of pressed glass stems and foot pieces to glass objects or articles, such as bowls or founts of various configurations or dimensions without the employment of a blow pipe for this purpose; whereby the process of manufacturing glass articles, particularly those composed of a blown bowl or fount, and a pressed stem and foot piece, is materially simplified, and the cost of production is reduced, while perfect connection of the parts and desirable pieces of ware are insured.

To accomplish this object my invention consists in the features of construction and the combination or arrangement of parts hereinafter described and claimed, reference being made to the accompanying drawings, in which—

Figure 1 is a vertical central sectional view of an apparatus constructed in accordance with my invention. Fig. 2 is a top plan view, omitting the stem and foot-piece mold. Fig. 3 is a horizontal sectional view, taken on the line 3—3 of Fig. 1. Fig. 4 is a bottom plan view. Fig. 5 is a detail plan view, showing the elastic base for sustaining the bowl or fount support; and Fig. 6 is a plan view, showing a bowl or fount in the process of being blown.

In order to enable those skilled in the art to make and use my invention, I will now describe the same in detail, referring to the drawings, wherein it will be seen that the frame of the apparatus is composed of a table or platform 1, vertical standards 2, three or more, and a bottom ring 4 detachably secured to the lower ends of the standards through the medium of screws 5, or otherwise. The table or platform is constructed with a central orifice 6, and a radial passage or opening 7, which communicates with the central orifice, so that a blown glass article 8 inserted into the central orifice through the radial passage or opening 7 can be caused to rest against the pressed glass stem and foot piece 9, indicated by dotted lines in Fig. 1 as arranged in the stem and foot-piece mold 10. This mold is of the ordinary construction which is adapted to be opened and closed, and it is detachably mounted on the table or platform, so that it can be readily removed and replaced for the purpose of interchangeably employing molds adapted to press stems and foot piece into different shapes or patterns. As here illustrated, the table or platform is provided with an overhanging flange or dove-tail rim 12, with which the base of the stem and foot-mold is adapted to engage, for the purpose of firmly holding the mold down upon the table or platform. The table or platform is preferably secured to the upper ends of the standards 2 by screws 13, or other suitable fastenings, and the standards may rise vertically from a circular base 14 which supports a guide-ring 15 in which a hollow bowl or fount support is adapted to move vertically. The bowl or fount support is composed of an internally threaded sleeve 16, and an externally threaded sleeve 17 which screws into the sleeve 16, and can be adjusted therein toward and from the stem and foot mold, for the purpose of increasing or diminishing the distance between the adjustable sleeve 17 and the stem and foot mold to accommodate bowls, founts, or other articles 8 of varying dimensions. The adjustable sleeve 17 is provided internally with a series of shoulders 18 three or more so relatively disposed as to receive between them and support the neck 19 of the bowl, fount, or other article 8, as will be understood by reference to Fig. 1. The lower end of the sleeve 16 rests upon the outer margin of an elastic base 20, composed of a disk of spring metal which is secured to and supported at its center by a central projection 21 on a vertically movable rigid disk 22, the periphery of which fits accurately into the base 14, so that the disk 22 can rise and fall therein. The connection between the elastic base or disk 20 and the rigid disk 22 is preferably composed of a bolt 23, but any other attaching devices may be employed. The rigid disk 22 is adapted to be raised and lowered through the medium of a cam or eccentric 24 arranged in orifices in the pendent rim 25 of the rigid disk 22, so that by rotating the cam or eccentric in the proper direction, the rigid disk is raised, and the bowl or fount support is yieldingly forced toward the stem and foot mold for the purpose of subsequently pressing the stem and foot-piece 9 downward against the bowl or fount 8, whereby the danger of fracturing the blown bowl or fount is entirely avoided, and any ordinary pressure can be exerted without liability of crushing or breaking the bowl or fount.

The end portion of the cam or eccentric 24 is provided with journals 26, Fig. 4, arranged between the ring 4 and the base 14, and one of the journals is provided with a suitable lever 27 for the purpose of rotating the cam or eccentric.

In manufacturing glass articles, particularly those composed of a blown bowl and pressed stem and foot-piece, the bowl or fount is blown, as in Fig. 6. The bowl or fount is then cut, broken, or otherwise severed at the point 28, Fig. 6, and the neck portion 19 is introduced between the shoulders 18 of the bowl or fount support, while the opposite end of the article is passed through the radial passage or opening 7 until it is properly centered with relation to the stem and foot-piece mold 10. The cam or eccentric is then rotated in the proper direction through the medium of the lever 27 to raise the rigid disk 22, which forces the elastic base or disk 20 in an upward direction and raises and yieldingly supports the bowl or fount 8. The stem and foot-piece 9 are now formed in the mold 10 and then the said stem and foot-piece are pressed downward against the bowl or fount 8, which will yield to pressure and consequently any ordinary pressure can be exerted without liability of crushing or breaking the bowl or fount. After the stem and foot-piece are connected, the article is removed, the bowl or fount support being lowered for the subsequent operation.

By constructing the bowl or fount support of adjustable sections to vary its height, the article can be readily inserted and removed, and larger or smaller articles can be practically produced.

The shape or configuration of the shoulders 18 will be such as to suit the conditions required, or the shape of the article being operated upon, and the form of the table or platform at the point where the stem and foot-piece are to be attached to the bowl or fount will be such as to accommodate any shape of bowl, fount, or other article, such as flat, oval, round, or oblong.

The guide-ring 14 accurately guides the bowl or fount support in its vertical movement, and in connection with the supporting shoulders 18 serves to accurately center the article 8, the whole construction and arrangement being such that any form or construction of stem and foot-piece can be attached to a blown bowl or fount of any desired configuration without the use of a blow pipe for such purpose.

The apparatus described and shown simplifies the manufacture of glass articles, and reduces the cost of production, while obtaining a perfect attachment of the stem and foot-piece to the bowl, fount, or other article.

Having thus described my invention, what I claim is—

1. The combination with a supporting frame, and a mold thereupon, of a vertically movable bowl or fount-support, an elastic base which sustains the bowl or fount-support, and mechanism acting directly upon said elastic base to press it upward and thereby yieldingly force the bowl or fount-support toward the said mold, substantially as described.

2. The combination with a supporting frame, and a mold thereupon, of a bowl or fount-support composed of sections one of which is vertically adjustable upon the other for varying the distance between the said support and the said mold, an elastic base which sustains the bowl or fount-support, and mechanism acting directly upon said elastic base to press it upward and thereby yieldingly force the bowl or fount-support toward the said mold, substantially as described.

3. The combination with a supporting frame, and a mold thereupon, of a bowl or fount-support composed of two screw-threaded sections, one of which screws into the other for varying the distance between the said support and the said mold, and mechanism for moving the said adjustable bowl or fount-support toward the said mold, substantially as described.

4. The combination with a supporting frame, and a stem and foot mold mounted thereupon, of a bowl or fount support adjustable toward and from the stem and foot mold, an elastic base for sustaining the bowl or fount support, a vertically movable rigid support for the elastic base, and means for forcing the said rigid support toward the mold, substantially as described.

5. The combination of a frame having a table or platform provided with an opening to receive a bowl or fount, a stem and foot piece mold mounted on the table or platform, a bowl or fount support composed of sections one of which is adjustable on the other for varying the distance between the said support and the said mold, an elastic base for sustaining the sectional bowl or fount support, a movable support for the elastic base, and means for forcing the support of the elastic base toward the stem and foot-piece mold, substantially as described.

6. The combination of a frame having a table or platform provided with an orifice to receive a bowl or fount, a stem and foot-piece mold, an adjustable bowl or fount support movable toward and from the mold, a guide for the adjustable bowl or fount support, an elastic base for sustaining the bowl or fount support, a movable support for the elastic base, and a cam or eccentric for forcing the support of the elastic base toward the mold, substantially as described.

In testimony whereof I have hereunto set my hand in presence of two subscribing witnesses.

LOUIS SCHAUB.

Witnesses:
JOHN YEAGER,
CHARLES SCHAUB.